United States Patent [19]

Arrowood

[11] Patent Number: 5,082,312
[45] Date of Patent: Jan. 21, 1992

[54] METHOD FOR COMPILING A PHOTO ADVICE BOOK

[76] Inventor: Lisa N. Arrowood, 11651 Chelsea Ct., Fishers, Ind. 46038

[21] Appl. No.: 536,189

[22] Filed: Jun. 11, 1990

[51] Int. Cl.⁵ .............................................. B42D 15/00
[52] U.S. Cl. ..................................... 283/67; 281/15.1
[58] Field of Search ...................... 40/158.1, 530, 584, 40/299; 281/15.1, 22; 283/81, 67

[56] References Cited

U.S. PATENT DOCUMENTS

| | | | |
|---|---|---|---|
| 120,260 | 10/1871 | Hawes | 40/530 |
| 140,245 | 6/1873 | Clemens | 40/158.1 X |
| 271,765 | 2/1883 | Augir | 281/15.1 X |
| 4,951,969 | 8/1990 | Epstein et al. | 40/299 X |
| 4,965,948 | 10/1990 | Ruebens | 281/15.1 X |

Primary Examiner—Howard N. Goldberg
Assistant Examiner—Peter Dungba Vo
Attorney, Agent, or Firm—Woodard, Emhardt, Naughton, Moriarty & McNett

[57] ABSTRACT

An assembly and method for compiling an advice book include providing printed instruction forms directable to an invitee to a gathering held for an honoree thereof and instructing the invitee to be prepared to provide advice to the honoree and to bring to the gathering a picture which corresponds to the advice or the invitee or the gathering; providing an advice book having a plurality of pages adapted to receive pictures mounted thereon and having a plurality of pages having indicia thereon adapting them for receipt of the corresponding written advice; causing the instruction forms to be delivered to invitees; and then, at the gathering, affixing the pictures and corresponding advice from each invitee on pairs of adjacent facing pages or on the same page so that the two can be viewed simultaneously.

11 Claims, 2 Drawing Sheets

*Special Marriage Advise Book*
(This is a secret gift-please do not tell Valerie)

To help Valerie commemorate this auspicious occasion, please bring a picture of yourself or of you and Valerie or of however you would like her to remember you. In addition, please prepare some "Marriage Advise" to be placed opposite your picture. We will complete the book at the shower. It will look something like the following :

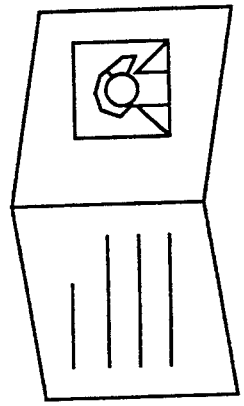

Fig. 3

METHOD FOR COMPILING A PHOTO ADVICE BOOK

FIELD OF THE INVENTION

The present invention relates to the field of novelty devices, and in particular to a method and assembly for compiling an advice book.

BACKGROUND OF THE INVENTION

While cameras have been commercially available for many years, only in roughly the last decade have they been commonly owned by large majority of the consuming public. From a standard pocket model to the more expensive single-lens reflex models and others, nearly everyone owns a camera. Consequently, more and more pictures are being taken, and memorable and spontaneous moments, heretofore otherwise unrecorded, are being captured on film. Some of these pictures are put into albums, many are left in the developers' envelopes and pulled out from time to time, some are distributed to friends, and many get stored away never to be seen again. Often the story behind the picture is forgotten or the picture's novelty or hilarity is not fully realized. The present invention provides a novel manner for using pictures capturing memorable moments as well as providing a unique compilation of creative sentiments for presentation to an honored person or persons.

SUMMARY OF THE INVENTION

Generally speaking, the present invention provides an assembly and method for compiling an advice book to the honoree of a gathering such as a marriage shower, birthday, graduation or the like.

An assembly or kit for compiling an advice book includes printed instruction forms to be sent to persons invited to a gathering and instructing those persons to bring a picture and to be prepared to provide advice corresponding to that picture or to themselves. Also included in the kit is an advice book having a number of pages, some of which are adapted to have a picture affixed thereto and some of which are adapted to receive advice printed or affixed thereto and viewable in conjunction with the picture. The kit also includes means for affixing the pictures to the pages. The person compiling the advice book sends the instruction forms to the invitees to the gathering. At the gathering the invitees will then affix their pictures to pages and add their corresponding advice to adjacent facing pages. This step is repeated for each invitee, thereby completing the advice book. The book is then presented to the honoree of the gathering.

It is an object of the present invention to provide a novel means for compiling an advice book.

It is another object of the present invention to provide a means for compiling an advice book using pictures of memorable moments.

It is another object of the present invention to provide means for compiling in a novel way advice from various persons directed to the honoree of a gathering.

Further objects and advantages of the present invention will become apparent from the following description of the preferred embodiment.

BRIEF DESCRIPTION OF THE DRAWINGS

FIG. 3 is an enlarged, plan view of a typical instruction form of the assembly of FIG. 1.

DESCRIPTION OF THE PREFERRED EMBODIMENT

Figure 1:
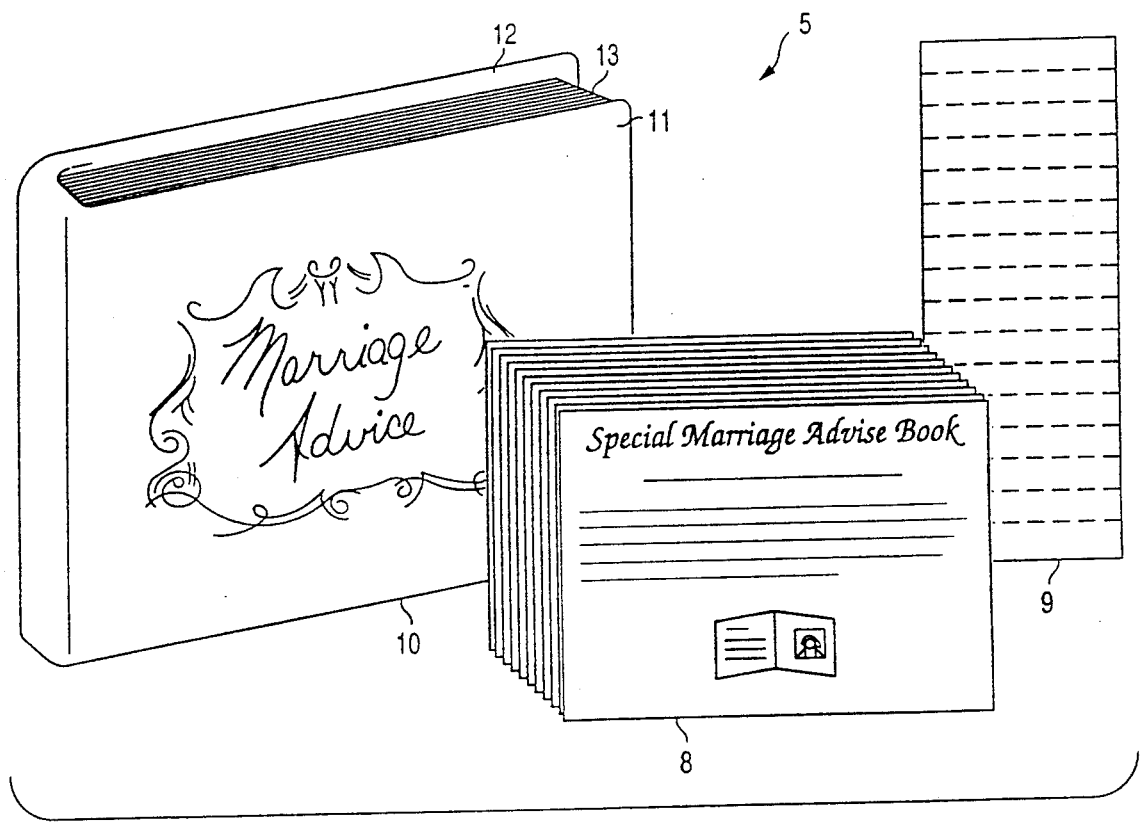
FIG. 1 is a perspective view of an assembly or kit for compiling an advice book in accordance with the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is shown an assembly or kit 5 for compiling an advice book in accordance with the preferred embodiment of the present invention. While kit 5 of the present embodiment is designed for compilation of a "marriage advice" book, other themes are contemplated by the present invention such as birthdays, graduations, divorces and any other themes devisable.

Kit 5 includes a set of instruction forms 8, a quantity of double-faced tape pieces 9 and an advice book 10. Book 10 includes front and back covers 11 and 12 with pages 13 bound therebetween. Front cover 11 of the preferred embodiment bears the book's title and theme "Marriage Advice" in embroidery thereon. While the title of the present book is and the following description is directed to marriage advice, other titles and themes are contemplated by the present invention as described herein.

Figure 2:
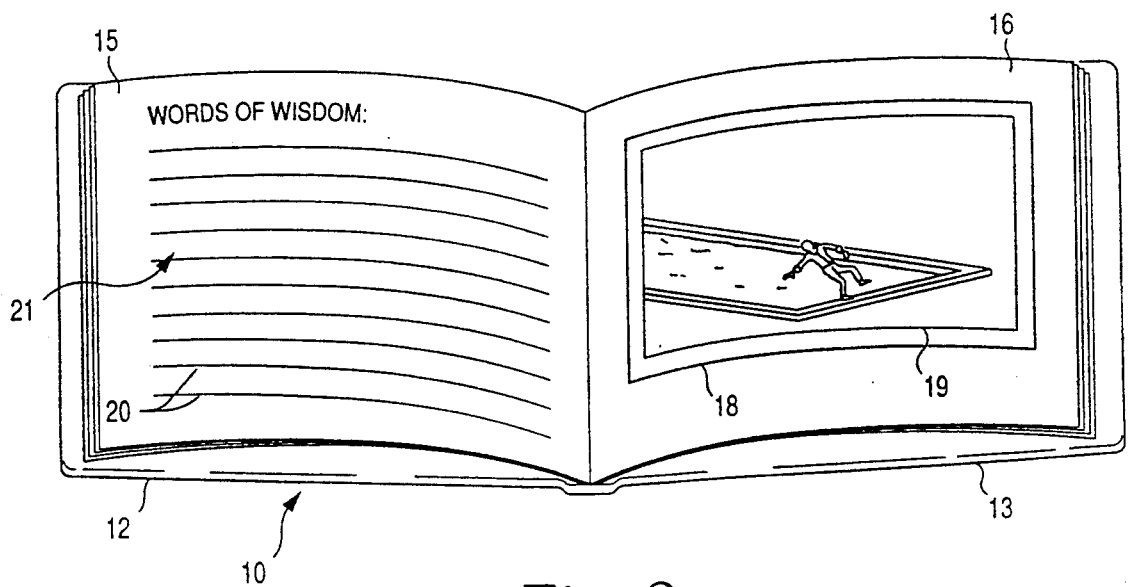
FIG. 2 is a perspective view of the advice book of FIG. 1 with the book shown opened to a typical pair of adjacent and facing pages.

Referring to FIG. 2, book 10 is shown opened to a typical pair of adjacent and facing pages 15 and 16. Page 16 is provided with indicia 21 for receipt of advice. Here, that indicia 21 consists of a number of vertically spaced, horizontal lines 20 and the phrase, "WORDS OF WISDOM:" printed at the top thereof. Other indicia may be used as appropriate for indicating the addition of printed advice. For example, lines 20 may be omitted. Also, an instruction of where or how to add the advice may be provided elsewhere such as at the front of the book. The adjacent, facing Page 15 has a rectangular border 18 printed thereon to indicate the proper positionment of a picture 19.

Referring to FIG. 3 there is shown an instruction form 22 used in the present invention in conjunction with advice book 10. In the present embodiment, instruction form 22 is to be delivered to invitees to a marriage shower thrown for a person, Valerie. The preferred manner of delivery is in the same envelope with the shower invitation, but the invitations may be delivered separately, by mail or by hand, as appropriate. Form 22 includes blanks 23 which are filled in by the user with the name(s) of the gathering's honoree, Valerie. Instruction form 22 includes a title at 24, an admonition at 25 to keep the advice compilation a secret, and instructions 26. As described in instructions 26, the recipient thereof, who is expected to attend the gathering or marriage shower, is to bring a picture and be prepared to provide some advice directed to the person for whom the gathering is thrown. Instructions 26 should also indicate the desired relationship among the picture, the gathering, the invitee and the advice. Here, the picture to be brought is described as one of the invitee, the invitee and the gathering's honoree (Valerie) or of however the invitee would like the honoree to remember the invitee. The instructions may be as broadly or narrowly phrased as desired by the person preparing the advice book to provoke the desired type of response from the invitee. For example, for a gathering under a different theme such as a fortieth birthday party, the invitee may be instructed to bring a picture of the honoree's most embarrassing moment and be prepared to provide advice directly associated with the subject matter of the picture. Generally, the goal of the instructions is to cause the recipient thereof to be prepared to submit his, her or their creative element to a compilation in the form of a picture and written subject matter.

In use, the person organizing the shower or other gathering will follow a set of user instructions (not shown) which would be provided with kit 5 and which would fully explain how kit 5 is to be used. Such person fills in blanks 23 on instruction form 22 with the name of the shower's honoree—in the present embodiment, Valerie. The completed instruction forms are then distributed to the invitees to the shower preferably by enclosing them with the shower invitations. At the shower, an invitee affixes his or her picture 19 within the designated border 18 on a page 15 in any appropriate manner. In the present embodiment, double-sided tape pieces 9 are provided. That invitee also adds his or her advice on the adjacent facing page 16 according to any indicia 21 which is provided. The advice may be written directly onto the page 16 or it may be brought to the shower previously prepared on a sheet-like material such as paper which is then added or affixed to page 16 with appropriate means such as glue or tape. The process is repeated for other invitees on other pairs of pages 13 like pages 15 and 16. Upon completion of this process, the Marriage Advice book is presented to the honoree of the marriage shower.

In another embodiment, the border 18 and corresponding indicia 21 for the advice may both be provided on the same page face. The adjacent facing page may then have its own border 18 and indicia 21 for receipt of another picture and advice, thereby increasing the capacity of the book.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for compiling an advice book, comprising the steps of:
   providing printed instruction forms directable to at least one invitee to a gathering held for at least one person and instructing the invitee to be prepared to provide advice directed to said at least one person at the gathering and to bring to the gathering a picture which corresponds to one of the advice and the at least one invitee;
   providing an advice book having a number of pages at least some of which are adapted to receive at least one picture mounted thereon and at least some of said number of pages having indicia thereon for receiving written advice;
   causing a plurality of said printed instruction forms to be delivered to a corresponding number of invitees;
   at said gathering, affixing a first picture brought to said gathering by one of said invitees to one of said pages and adding first advice corresponding to said first picture to a page whereby said first picture and corresponding first advice are clearly viewable simultaneously when said book is open; and,
   repeating said affixing step for other of said invitees.

2. The method for compiling an advice book of claim 1 wherein said affixing step includes affixing said first picture to a face of one page and adding said first advice corresponding to said first picture to the face of an adjacent facing page.

3. The method for compiling an advice book of claim 1 wherein said affixing step includes adding said first picture and said first advice to the same face of the same page.

4. The method for compiling an advice book of claim 1 wherein said providing an advice book step includes said indicia including a number of vertically-spaced horizontal lines.

5. The method for compiling an advice book of claim 1 wherein delivery of said printed instruction forms of said causing step is performed by mailing said instruction forms with invitations to the gathering.

6. The method for compiling an advice book of claim 1 wherein said providing an advice book step includes the pages being adapted to receive at least one picture and including indicia thereon indicating positionment of the picture.

7. The method for compiling an advice book of claim 1 further including providing securing means for affixing pictures to pages of said advice book and wherein said affixing step includes said first picture being affixed to one of said pages by said securing means.

8. The method for compiling an advice book of claim 7 wherein said providing securing means step includes said securing means including double-faced tape.

9. A method for compiling an advice book, comprising the steps of:
   providing printed instruction forms directable to at least one invitee to a gathering held for an honoree thereof, said forms instructing the invitee to be prepared to provide advice to the honoree and to bring to the gathering a picture which corresponds to at least one of the advice, the at least one invitee and the gathering;
   providing an advice book having a plurality of pages adapted to receive pictures mounted thereon and having a plurality of pages having indicia thereon for receiving the corresponding written advice;
   causing the instruction forms to be delivered to invitees to the gathering; and,
   at the gathering, affixing the pictures and corresponding advice from each invitee on pages of said book so that each picture and its corresponding advice can be viewed simultaneously.

10. The method for compiling an advice book of claim 9 wherein the affixing step includes affixing each picture and corresponding advice to pairs of adjacent facing pages.

11. The method for compiling an advice book of claim 9 wherein said affixing step includes affixing each picture and its corresponding advice to a single page face.

* * * * *